Patented June 5, 1945

2,377,795

UNITED STATES PATENT OFFICE 2,377,795

SYNTHESIS OF ADIPONITRILE

Donald John Loder, Wilmington, Del., assignor to E. I. du Pont de Nemours & Company, Wilmington, Del., a corporation of Delaware No Drawing. Application January 18, 1944, Serial No. 518,741

7 Claims. (Cl. 260—464)

This invention relates to the synthesis of adiponitrile from adipic acid and a nitrile of an aliphatic acid and more particularly to its synthesis from adipic acid and acetonitrile.

An object of the present invention is to provide a process for the preparation of adiponitrile. Another object is to provid a process wherein acetonitrile or a correspondin. organic acid nitrile is reacted with adipic acid to produce adiponitrile. A further object is to provide the reaction conditions and catalysts for the synthesis. Other objects and advantages of the invention will hereinafter appear.

In accord with this invention it has been found that adiponitrile can be prepared by reacting a dicarboxylic acid with a nitrile of an organic acid in accord with the equation:

HOOC(CH$_2$)$_4$COOH+2RCN→
NC(CH$_2$)$_4$CN+2RCOOH in which R is an alkyl group such, for example, as methyl, ethyl, propyl, isopropyl, butyl and the like. More specifically it is prepared by reacting adipic acid with acetonitrile in accord with the equation:

HOOC(CH$_2$)$_4$COOH+2CH$_3$CN→
NC(CH$_2$)$_4$CN+2CH$_3$COOH

The reaction may be carried out by charging a reaction vessel with the aliphatic acid nitrile and adipic acid in the presence or absence of a catalyst, closing the vessel and heating the resulting mixture under autogenous pressure. By this process it is possible to produce excellent yields of adiponitrile and although some by-products of the reaction are formed such as acetic acid and acetamide, these by-products can be readily reconverted to acetonitrile and returned to the reaction thus avoiding substantial losses in by-product formation.

The examples illustrate preferred embodiments of the invention in which parts are by weight unless otherwise indicated.

*Example 1.*—A silver-lined pressure resisting autoclave was charged with 0.4 mole of adipic acid and 3.0 moles of acetonitrile. The autoclave was closed and its contents heated to a temperature of approximately 300° C. and the reactants held at this temperature for approximately ten minutes. The reaction mixture was allowed to cool, the reaction product discharged and fractionally distilled under reduced pressure of less than 4 mm. mercury absolute. Adiponitrile was recovered in a conversion based on adipic acid to adiponitrile of approximately 65%.

*Example 2.*—A silver-lined pressure resisting rocker tube was charged with 0.6 mole of adipic acid and 12.0 moles of acetonitrile. The reaction was conducted at a temperature of approximately 300° C. and an autogenous pressure of approximately 900 atmospheres developed. The reaction was conducted at that temperature for approximately 15 minutes. After cooling the reaction mixture it was discharged, washed with 100 cc. of acetonitrile and then distilled in a packed column under reduced pressure to give approximately a 66.8% conversion of adipic acid to adiponitrile.

In the table which follows the reactions were conducted substantially in accord with the conditions described in Examples 1 and 2 except in those cases where indicated.

Table

| | Example Nos. | | | | |
|---|---|---|---|---|---|
| | 1 | 2 | 3 | 4 | 5 |
| Acetonitrile..........moles.. | 4.0 | 1.5 | 8.4 | 2.4 | ---- |
| Propionitrile..........do.... | ---- | ---- | ---- | ---- | 2.0 |
| Adipic acid..........do.... | 0.2 | 0.5 | 2.0 | 0.6 | 0.5 |
| Catalyst................... | (¹) | (¹) | (²) | (³) | ---- |
| Amount..........per cent.. | 3 | 3 | 1.2 | 1.5 | ---- |
| Temperature..........° C.. | 250–260 | 225 | 260 | 260 | 265 |
| Pressure..........atms.. | ---- | ---- | 440–550 | ---- | 30 |
| Time..........minutes.. | 30 | 60 | 30 | 30 | 35 |
| Conversion to adiponitrile based on adipic acid percent.................. | 56.4 | 71.3 | 77.2 | 63.7 | 57.3 |

¹ Ammonium phosphate.
² Phosphoric acid.
³ Sulfuric acid.

In the examples described in the table in which no pressure is given the pressure varied from less than 50 atmospheres to about 500 atmospheres; pressure, however, may be used ranging from atmospheric pressure to 1000 atmospheres or more. Similarly the reaction temperature may vary over a wide range from, for example, 150 to 350° C. and preferably between 225 and 300° C.

The reaction generally does not require under these preferred conditions more than 50 minutes and at temperatures ranging between 260 and 300° C. optimum conversions in batchwise operation are obtained if from 15 to 45 minutes are allowed.

Catalysts may be employed if desired such, for example, as phosphoric acid, sulfuric acid, ammonium phosphate, hydrochloric acid, either concentrated or anhydrous, boric acid or boron phosphate. These catalysts should be present in amounts ranging from in the order of 0.1% to 2.0% based on the adipic acid present.

In addition to the adiponitrile, acetic acid and a small amount of acetamide, or amides of the other acid nitriles used, are obtained as by-products which may be separated from the adiponitrile by fractional distillation. If desired, these by-products as well as the other unidentified by-products of the reaction may be returned to the reaction zone. By this procedure it is possible to inhibit their formation.

While the examples illustrate batchwise or discontinuous operation the process may if desired be carried out in a continuous manner by the introduction of the organic acid nitrile and adipic acid continuously into a tubular converter of relatively great length to diameter the reaction being conducted in said converter under the above designated preferred conditions and the products continuously removed from the tubular converter whereupon they are subjected to fractional distillation for the recovery of the adiponitrile in a continuous manner.

Inasmuch as the reaction involves stoichiometrically the reaction of at least two moles of acetonitrile per mole of adipic acid and moreover as the acetonitrile is relatively stable under the reaction conditions it is preferably added in excess, that is, in amounts ranging from in the order of 2.5 to 8 moles thereof per mole of the adipic acid. By operating with an excess of the actonitrile an excellent conversion of the adipic acid to adiponitrile is assured and, the excess acetonitrile may be recycled without substantial loss as it is not decomposed during the reaction.

I claim:

1. A process for the preparation of adiponitrile which comprises heating approximately 8.4 moles of acetonitrile with approximately 2 moles of adipic acid in the presence of about 1½% phosphoric acid as the catalyst at a temperature of approximately 260° C., conducting the reaction under a pressure of approximately 500 atmospheres for about 30 minutes, and recovering the adiponitrile by fractional distillation.

2. A process for the preparation of adiponitrile which comprises introducing adipic acid and a stoichiometrical excess of a mononitrile of an aliphatic organic acid into a reaction mixture, subjecting the resulting mixture to a reaction at a temperature between 150 and 300° C. in the presence of an acid catalyst and separating adiponitrile from the reaction mixture by fractional distillation.

3. A process for the preparation of adiponitrile which comprises introducing adipic acid and a stoichiometrical excess of acetonitrile into a reaction mixture and subjecting the resulting mixture to a reaction at a temperature between 150 and 300° C. in the presence of an acid catalyst and separating adiponitrile from the reaction mixture by fractional distillation.

4. The process of claim 3 conducted in the presence of phosphoric acid as the catalyst.

5. A process for the preparation of adiponitrile which comprises introducing adipic acid and a stoichiometrical excess of propionitrile into a reaction mixture and subjecting the resulting mixture to a reaction at a temperature between 150 and 300° C. in the presence of an acid catalyst and separating adiponitrile from the reaction mixture by fractional distillation.

6. A process for the preparation of adiponitrile which comprises preparing a reaction mixture containing 2.5 to 8 mols of acetonitrile per mol of adipic acid, subjecting the reaction mixture to a temperature between 225 and 300° C. in the presence of an acid catalyst and separating adiponitrile from the reaction mixture by fractional distillation.

7. The process of claim 6 conducted under a pressure of above 50 atmospheres.

DONALD JOHN LODER.